US010684252B2

(12) United States Patent
Miyamura et al.

(10) Patent No.: US 10,684,252 B2
(45) Date of Patent: Jun. 16, 2020

(54) MEASURING INSTRUMENT

(71) Applicant: HORIBA, Ltd., Kyoto-shi, Kyoto (JP)

(72) Inventors: Kazuhiro Miyamura, Kyoto (JP); Yoko Nakai, Kyoto (JP)

(73) Assignee: HORIBA, Ltd., Kyoto-shi, Kyoto (JP)

( * ) Notice: Subject to any disclaimer, the term of this patent is extended or adjusted under 35 U.S.C. 154(b) by 388 days.

(21) Appl. No.: 15/362,290

(22) Filed: Nov. 28, 2016

(65) Prior Publication Data
US 2017/0168011 A1 Jun. 15, 2017

(30) Foreign Application Priority Data

Dec. 14, 2015 (JP) ................. 2015-243582

(51) Int. Cl.
G01N 27/30 (2006.01)
G01N 27/36 (2006.01)
G01N 27/416 (2006.01)

(52) U.S. Cl.
CPC ....... G01N 27/4167 (2013.01); G01N 27/301 (2013.01); G01N 27/36 (2013.01)

(58) Field of Classification Search
CPC ... G01N 27/4167; G01N 27/301; G01N 27/36
USPC ..................... 324/438; 204/403.13
See application file for complete search history.

(56) References Cited

U.S. PATENT DOCUMENTS 4,579,641 A * 4/1986 Shimomura ....... G01N 27/4035
204/403.13
6,365,033 B1 * 4/2002 Graham ............. G01N 27/4161
204/412

2009/0283404 A1 11/2009 Kakiuchi et al.
2011/0147213 A1 * 6/2011 Auerswald ............ G01N 27/36
204/415

FOREIGN PATENT DOCUMENTS

CN 1266487 A 9/2000
CN 101523201 A 9/2009
CN 102183564 A 9/2011
(Continued)

OTHER PUBLICATIONS

Japan Patent Office, Office Action Issued in Application No. 2016238425, Sep. 30, 2019, 6 pages.
(Continued)

Primary Examiner — Farhana A Hoque
(74) Attorney, Agent, or Firm — Alleman Hall Creasman & Tuttle LLP

(57) ABSTRACT

A measuring instrument is capable of suppressing a flow path from being clogged due to the precipitation of crystals from an internal solution or a calibration liquid even when kept in a waiting state. The measuring instrument includes a measuring electrode and a reference electrode and on the basis of the potential difference generated therebetween, measures a characteristic value of a sample. In order to accomplish the above object, the measuring instrument is adapted to be able to have two states, i.e., a measurement state of measuring the characteristic value of the sample and a waiting state of not performing measurement, and further include a refilling mechanism that refills the calibration liquid or the internal solution used in the reference electrode. In addition, the refilling mechanism is adapted to continuously or intermittently refill the calibration liquid or the internal solution in the waiting state.

7 Claims, 4 Drawing Sheets

(56) References Cited

FOREIGN PATENT DOCUMENTS

| | | | |
|---|---|---|---|
| JP | 06102240 | A | 4/1994 |
| JP | 10282036 | A | 10/1998 |
| JP | 2004212174 | A | 7/2004 |
| JP | 2015206630 | A | 11/2015 |
| WO | 9957549 | A1 | 11/1999 |

OTHER PUBLICATIONS

China National Intellectual Property Administration, Office Action Issued in Application No. 201611061857X, Nov. 19, 2019, 10 pages.

* cited by examiner

MEASURING INSTRUMENT

TECHNICAL FIELD

The present invention relates to a measuring instrument used as, for example, a pH measuring instrument or the like.

BACKGROUND ART

It is known that for example, in a measuring instrument adapted to measure the pH of a sample stored in a container using a glass electrode and a reference electrode, in a measurement state of measuring the pH of the sample or in a calibration state of using a calibration liquid having a known pH to correct the relationship of the potential difference generated between the glass electrode and the reference electrode with a measured value, an internal solution of the reference electrode gradually flows out from a liquid junction part provided in the reference electrode and is thereby reduced, and therefore in order to compensate for the shortage, the internal solution is appropriately refilled from a refilling port.
(Patent Literature 1)

For example, in the case of a measuring instrument adapted to continuously take in a sample using a sampling mechanism or the like to measure the pH of the sample, an internal solution of a reference electrode contacts with the continuously flowing sample through a liquid junction part and diffuses, and thereby the internal solution of the reference electrode is thinned or the internal solution flows out from the liquid junction part. Therefore, it is necessary to continuously or regularly refill the internal solution in a measurement state.

Also, in order to continuously perform the measurement with accuracy, it is necessary to calibrate measured values using a calibration liquid not only at the start of the measurement but at intervals of a predetermined period, and therefore it is necessary to regularly feed the calibration liquid while the sample is being continuously measured.

On the other hand, it has been thought that in a waiting state of performing neither the measurement nor the calibration, it is only necessary to refill the internal solution at the start of next measurement, and therefore a change in the amount of the internal solution has never been cared about from the beginning.

Further, it has been thought that for example, in particular, in a measuring instrument adapted to acquire a tiny amount of sample and continuously measure the pH of the sample, the sample in a waiting state is stopped from flowing, and only a tiny amount of the sample remains in a flow path, and therefore as compared with in a measurement state where the sample constantly flows, in the waiting state, the diffusion of an internal solution is unlikely to occur.

For these reasons, in a conventional measuring instrument of a continuous measurement type, refilling an internal solution in a waiting state has not been considered.

Also, since a calibration liquid has not been used in a waiting state of not performing calibration, refilling the calibration liquid in the waiting state has not been conventionally considered as well.

However, the present inventor has first found that when keeping a measuring instrument of a continuous measurement type as described above in a waiting state for a predetermined time or more, there occurs the problem that a calibration liquid or an internal solution evaporates inside a flow path that is provided for refilling the calibration liquid or the internal solution in a calibration state or a measurement state, and thereby crystals are precipitated from the calibration liquid or the internal solution to clog the flow path.

CITATION LIST

Patent Literature

Patent Literature 1: Japanese Unexamined Patent Publication JP-A 2004-212174

SUMMARY OF INVENTION

Technical Problem

The present invention is made in consideration of the above problem, and the principal object thereof is to provide a measuring instrument that is capable of suppressing a flow path from being clogged due to the precipitation of crystals from an internal solution or a calibration liquid even when kept in a waiting state for a predetermined time or more.

Solution to Problem

That is, the measuring instrument according to the present invention is a measuring instrument that includes a measuring electrode and a reference electrode and on the basis of the potential difference generated between the measuring electrode and the reference electrode, measures a characteristic value of a sample. In addition, the measuring instrument can have two states, i.e., a measurement state of measuring the characteristic value of the sample and a waiting state of not performing measurement. Further, the measuring instrument includes a refilling mechanism that refills a calibration liquid or an internal solution (internal liquid) used for the reference electrode, in which the refilling mechanism is adapted to continuously or intermittently refill the calibration liquid or the internal solution in the waiting state.

Since in such a measuring instrument, the refilling mechanism continuously or intermittently refills the internal solution or the calibration liquid even in the waiting state, the internal solution or the calibration liquid can be suppressed from being accumulated in a flow path to crystallize, and therefore the flow path can be suppressed from being clogged.

Meanwhile, in a conventional measuring instrument, there is a possibility that for some reasons such as one that an internal space of a reference electrode, which is a liquid-tight space but not an air-tight space, contacts with outside air at a liquid junction part, even in a waiting state, water may evaporate from an internal solution.

Therefore, in the measuring instrument in which a calibration liquid refilling flow path through which the calibration liquid flows and an internal solution flow path through which the internal solution flows are tightly closed and in states of being filled with the liquids inside, respectively, a reduction in the internal solution or the calibration liquid due to water evaporation does not occur in the waiting state, and therefore it is not necessary to refill the internal solution or the calibration liquid.

However, the present inventor has found that even in the case of a measuring instrument in which a flow path is tightly closed and filled with a liquid inside, when the measuring instrument is kept in a waiting state for a predetermined time or more, crystals caused by water evaporation are precipitated from an internal solution or a calibration liquid in the flow path to clog the flow path.

Further, the present inventor has confirmed by the below-described experiment that, for example, water evaporates even from the surface of the flow path.

When the water evaporation occurs from the surface of the tightly closed flow path as described and the measuring instrument is kept in the waiting state for the predetermine time or more, water evaporation from part of the calibration liquid or the internal solution accumulated in the flow path continues, and consequently crystals may be precipitated to clog the flow path.

In this regard, in the measuring instrument of the present invention, since the flow paths contain the liquids, respectively, when continuously or intermittently refill the internal solution or the calibration liquid in the waiting state, the internal solution or the calibration liquid surely moves through a corresponding one of the flow paths, and thereby a local increase in concentration due to water evaporation from the surface of that flow path can be suppressed. As a result, the calibration liquid or the internal solution can be suppressed from being crystallized.

The measuring instrument in which the calibration liquid refilling flow path and the internal solution flow path are wholly or partly capillary-shaped can remarkably produce the effect of suppressing clogging due to the crystallization of the calibration liquid and/or the internal solution because water evaporation from the surfaces of the flow paths greatly affect the calibration liquid and the internal solution in the flow paths, respectively.

As compared with the amount of the calibration liquid or the internal solution required to be supplied or refilled in the measurement state or a calibration state, the amount of the internal solution or the calibration liquid evaporating from the surface of a corresponding flow path, or the like, is small in the waiting state. Therefore, the measuring instrument in which the liquid amount of the calibration liquid or the internal solution refilled in the waiting state is small as compared with the liquid amount of the calibration liquid or the internal solution refilled for the same duration in the measurement state or the calibration state makes it possible to suppress the use amount of the calibration liquid or the internal solution to an appropriate amount.

The measuring instrument in which the calibration liquid or the internal solution of an amount equal to or more than the amount of water evaporating for a predetermined time in the waiting state is refilled for the predetermined time makes it possible to, in the waiting state, refill the calibration liquid or the internal solution of an amount appropriate for suppressing the precipitation of crystals from the calibration liquid or the internal solution.

The measuring instrument in which in the waiting state, the calibration liquid or the internal solution is refilled at least once per day and in an predetermined amount makes it possible to effectively suppress the crystallization of the calibration liquid or the internal solution to suppress a corresponding flow path from being clogged.

Advantageous Effects of Invention

In the measuring instrument as described above, since the refilling mechanism continuously or intermittently refill the internal solution or the calibration liquid even in the waiting state, the internal solution or the calibration liquid can be suppressed from being accumulated in a corresponding flow path to crystallize, and thereby the flow path can be suppressed from being clogged.

DESCRIPTION OF EMBODIMENTS

In the following, one embodiment of the present invention will be described with reference to drawings.

A measuring instrument 100 according to the present embodiment is one that is connected to and incorporated in a semiconductor manufacturing apparatus in order to measure the pH of a measured liquid, such as a chemical liquid used in a semiconductor manufacturing process, such as a cleaning liquid, a Cu plating liquid, an etching liquid for fabricating e.g. wiring, or a chemical liquid used for e.g. CMP (chemical mechanical polishing) in a wiring process.

Figure 1:
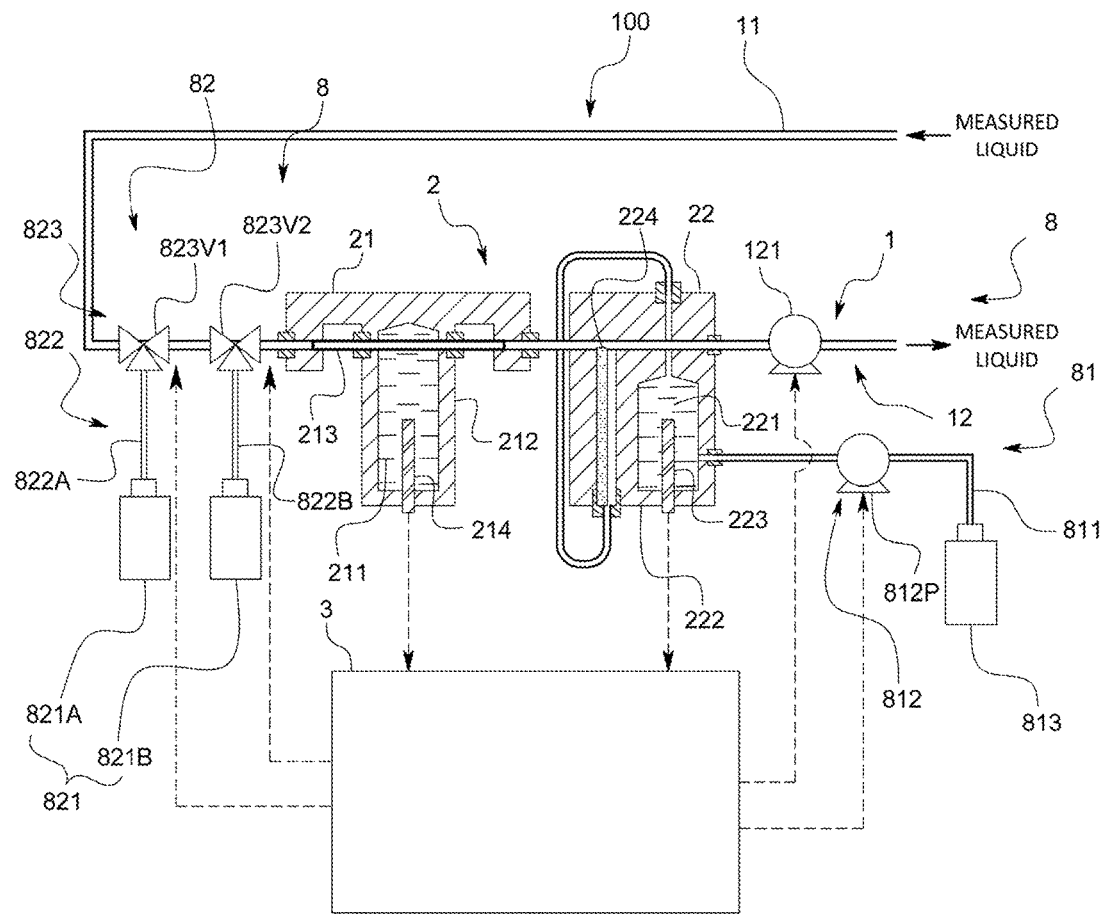
FIG. 1 is an overall schematic diagram of a measuring instrument in one embodiment of the present invention.
Figure 4:
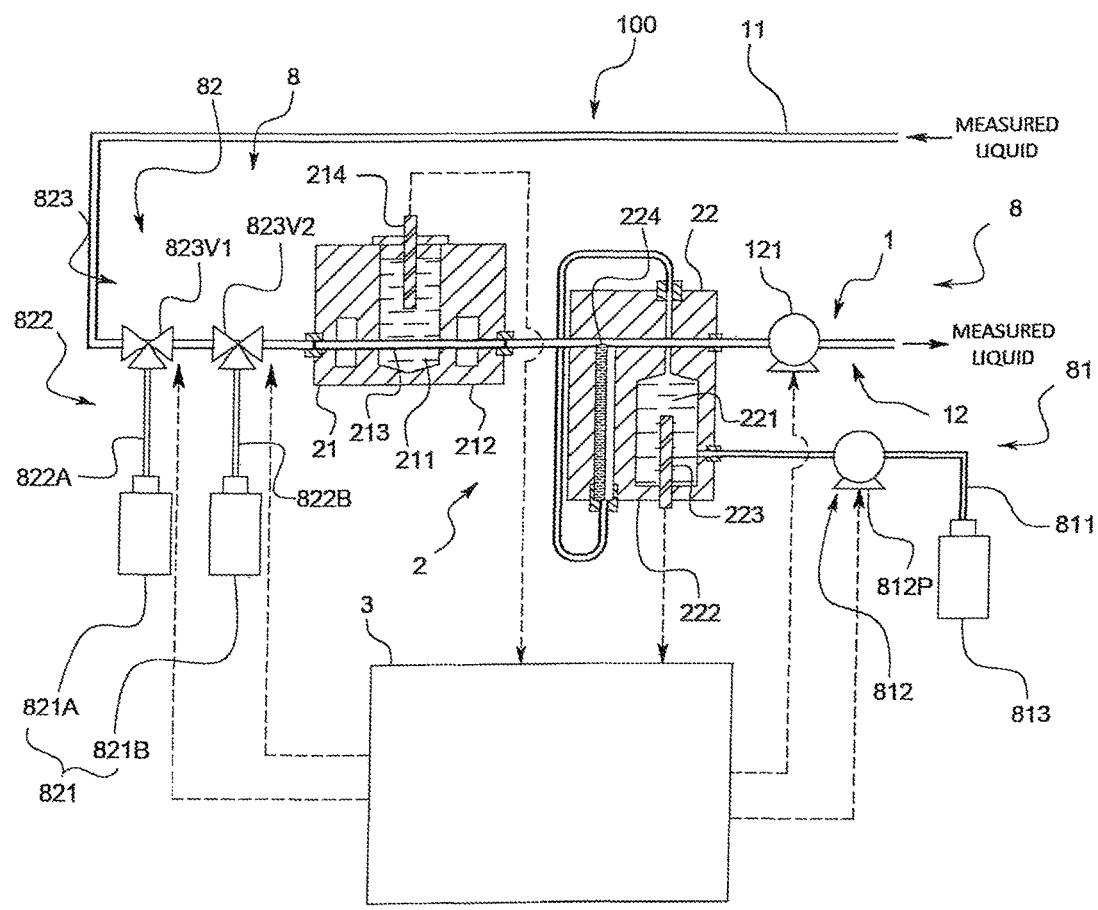
FIG. 4 is an overall schematic diagram of a measuring instrument in another embodiment.

As illustrated in FIG. 1 or FIG. 4, the measuring instrument 100 is one including: a sampling mechanism 1 that is connected to a main flow path (not illustrated) through which the measured liquid flows and samples part of the measured liquid; and a pH meter 2 adapted to measure the pH of the sampled measured liquid.

The sampling mechanism 1 is one including: a sampling flow path 11 communicatively connecting to the main flow path; and a circulation control mechanism 12 adapted to control such as the introduction of the measured liquid as a measurement sample into the sampling flow path 11.

The sampling flow path 11 is a flow path through which the sampled measured liquid or a calibration liquid flows. In addition, the sampling flow path 11 is formed of a tubing member having corrosion resistance to the measured liquid and a very thin path forming a capillary shape.

Note that the capillary shape refers to the shape of a tube of which the inside diameter is approximately 5 mm or less, preferably 3 mm or less, and the length is approximately five or more times the inside diameter.

The circulation control mechanism 12 is one including a sampling pump 121 provided in the sampling flow path 11 and a sampling control part adapted to control the action of the sampling pump 121.

In the present embodiment, the sampling control part is such that an information processing circuit 3 provided separately from the sampling pump 121 plays the role of the sampling control part. The information processing circuit 3 is one including some circuits such as: a digital circuit configured to include a CPU, memory, communication port, and the like; an analog circuit including a buffer, an amplifier, and the like, and AD and DA converters adapted to act as a bridge between the digital circuit and the analog circuit. In addition, the CPU and its peripheral devices cooperate in accordance with a predetermined program stored in the memory, and thereby the information processing circuit 3 fulfills a function as the sampling control part.

Further, it is configured to, when the sampling pump 121 operates in accordance with a command signal from the sampling control part, draw the part of the measured liquid flowing through the main flow path into the sampling flow path 11, and when the sampling pump 121 stops, stop sampling the measured liquid.

The pH meter 2 is one adapted to measure the pH on the basis of a so-called glass electrode method here, and includes a glass electrode 21, the reference electrode 22, and a pH calculation part adapted to calculate the pH on the basis of the potential difference between the respective electrodes 21 and 22.

As illustrated in FIG. 1, the glass electrode 21 is one that includes: a first body 212 that stores a first internal solution 211 inside; responsive glass that is provided in the first body 212; and a first internal electrode 214 that is immersed in the first internal solution 211.

The first body 212 is one that is formed of a material such as PVC (polyvinyl chloride), PP (polypropylene), PVDF (polyvinylidene fluoride), PTFE (polytetrafluoroethylene), or PFA (Perfluoroalkoxy alkane) and forms a hollow block body shape.

The first internal solution 211 is, for example, a KCl aqueous solution having a concentration of 3.3 M.

As well known, the responsive glass is one that interposes between the first internal solution 211 and the measured liquid as a measurement target and produces a potential due to the pH difference between the first internal solution 211 and the measured liquid. In the present embodiment, a tubular body 213 is formed of the responsive glass.

The tubular body 213 formed of the responsive glass is a very thin body that is made to penetrate so as to pass from one side surface of the first body 212 to the other side surface through a first internal space as an internal space of the first body 212 and forms a capillary shape similarly to the sampling flow path 11.

The start edge of the tubular body 213 is connected to the sampling flow path 11, and adapted such that the operation of the sampling pump 121 allows the measured liquid to be introduced from the main flow path into the tubular body 213.

Thus, the outer surface of the tubular body 213 contacts with the first internal solution 211 filled in the first internal space, and in addition to this, the introduction of the measured liquid into the tubular body 213 allows the responsive glass (tubular body 213) to interpose between the first internal solution 211 and the measured liquid as the measurement target as described above.

Note that in the present embodiment, the whole of the tubular body 213 is formed of the responsive glass; however, only a part contacting with the first internal solution 211 may be formed of the responsive glass.

The first internal electrode 214 is one that is formed of, for example, silver/silver chloride and forms a rod shape or a long plate shape. Also, the first internal electrode 214 is attached so as to penetrate through the bottom wall of the first body 212, and thereby part of the first internal electrode 214 is adapted to be immersed in the first internal solution 211.

Figure 2:
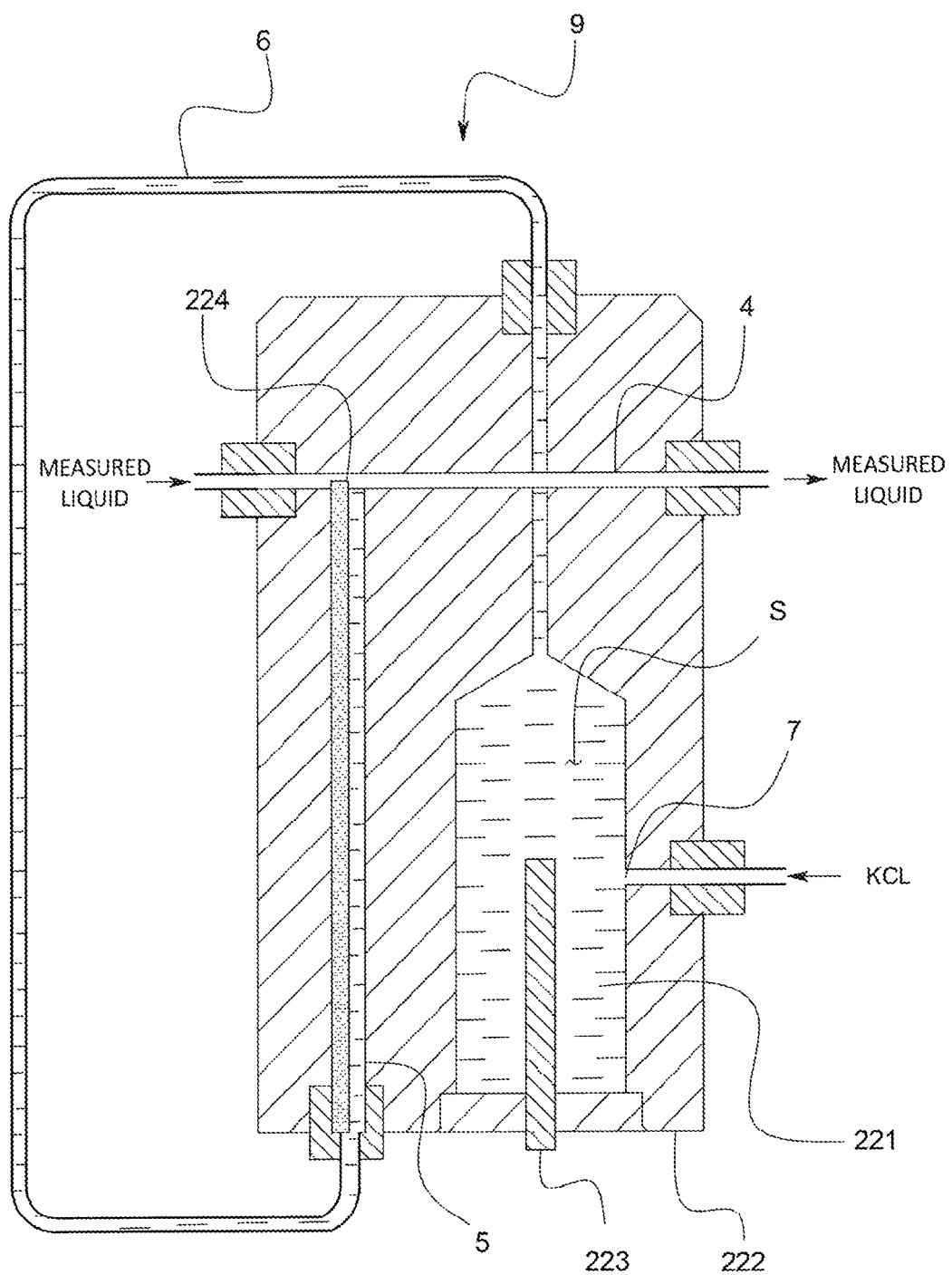
FIG. 2 is a cross-sectional view illustrating a reference electrode in the same embodiment.

As illustrated in FIG. 2, the reference electrode 22 is one including; a second body 222 that stores a second internal solution 221 inside; a second internal electrode 223 that is immersed in the second internal solution 221 and outputs a reference potential; and a liquid junction part 224.

The second body 222 is one that is formed of a material such as PVC (polyvinyl chloride), PP (polypropylene), PVDF (polyvinylidene fluoride), PTFE (polytetrafluoroethylene), or PFA (Perfluoroalkoxy alkane) and forms a hollow block body shape. In addition, in a second internal space S as an internal space of the second body 222, the second internal solution 221 is filled. The second internal solution 221 is, for example, a KCl aqueous solution having a concentration of 3.3 M.

In the second body 222, in addition to the second internal space S, a first internal flow path 4 into which the measured liquid is introduced is provided. The first internal flow path 4 is a through-hole penetrating from one side surface to the other side surface of the second body 222, and the start edge of the first internal flow path 4 is communicatively connected to the end edge of the tubular body 213. This configuration allows the measured liquid to be introduced into the first internal flow path 4 after passing through the tubular body 213. Note that the first internal flow path 4 is formed in a capillary shape having a small diameter similarly to the tubular body 213.

Connecting parts of the main flow path, the sampling flow path 11, the tubular body, and the first internal flow path 4 are respectively tightly closed with such as a sealing member, and the insides of the sampling flow path 11, the tubular body, and the first internal flow path 4 are in a state of being constantly filled with the sample, a calibration liquid, or another liquid such as a cleaning liquid.

The second internal electrode 223 is one that is formed of, for example, silver/silver chloride and forms a rod shape or a long plate shape. Also, the second internal electrode 223 is attached so as to penetrate through the bottom wall of the second body 222, and thereby part of the second internal electrode 223 is adapted to be immersed in the second internal solution 221.

The liquid junction part 224 is formed in a position where the first internal flow path 4 contacts with a second internal flow path 5 that is formed in the second body separately from the second internal space S and the first internal flow path 4 and externally bored such that an end part thereof reaches the first internal flow path 4.

Specifically, the second internal space S is connected to the second internal flow path 5 through an internal solution bypass flow path 6 that has the inside diameter formed to be small on the upper side than a region where the second internal electrode 223 is inserted in FIG. 2, i.e., in an end part on a side opposite to the bottom wall and separates the liquid junction part 224 and the second internal space S from each other by a predetermined distance in a part where the fore end of the small diameter part is opened toward the outside of the second body 222. Inside the second internal flow path 5, a plate-like porous member is arranged, and the liquid junction part 224 is formed such that the second internal solution 221 in the second internal flow path 5 contacts with the first internal flow path 4 through the porous member.

The internal solution bypass flow path 6 is one that is formed of, for example, an elastic tube using an olefinic elastomer or the like as a raw material and preventing water from easily evaporating from the surface, and of which, for example, the length is 300 mm, inside diameter is 1 mm, and outside diameter is 3 mm.

Meanwhile, as described above, the internal solution is reduced in amount by outflow from the liquid junction part 224 or evaporation of water, and therefore it is configured to, in the reference electrode 22, form an internal solution refilling port 7 that is bored from outside the second body 222 toward the second internal space S, and allow a refilling mechanism 8 to refill the second internal solution 221 from the internal solution refilling port 7.

The refilling mechanism 8 includes an internal solution refilling mechanism 81 adapted to refill the internal solution and a calibration liquid refilling mechanism 82 adapted to refill the calibration liquid.

The internal solution refilling mechanism 81 is one including an internal solution refilling flow path 811, an internal solution circulation mechanism 812 adapted to control the flow of the internal solution, and an internal solution storage tank 813 adapted to store the internal solution.

The internal solution refilling flow path 811 is one that forms an internal solution flow path 9 together with the internal solution bypass flow path 6 and the second internal flow path 5, and connects between the internal solution refilling port 7 and the internal solution stored in the internal solution storage tank 813.

Similarly to the internal solution bypass flow path 6, the internal solution refilling flow path 811 is one that is formed of, for example, an elastic tube using an olefinic elastomer or the like as a raw material and preventing water from easily evaporating from the surface, and of which, for example, the length is 300 mm, inside diameter is 1 mm, and outside diameter is 3 mm.

The internal solution circulation mechanism 812 is one that includes: an internal solution refilling pump 812P provided in the internal solution refilling flow path 811; and an internal solution control part.

In the present embodiment, the internal solution control part is such that the CPU and its peripheral devices cooperate in accordance with a predetermined program stored in the memory of the information processing circuit 3 and thereby the information processing circuit 3 fulfills a function as the internal solution control part.

Connecting parts of each of the flow path and space from the internal solution storage tank 813 to the liquid junction part 224 through the second internal space S and the internal solution flow path 9 are sealed and tightly closed with a sealing member or the like, and the fore end of a tube forming the internal solution refilling flow path 811 is immersed in the internal solution in the internal solution storage tank 813. As a result, the flow path and space from the internal solution storage tank 813 to the liquid junction part 224 are filled with the second internal solution 221.

The calibration liquid refilling mechanism 82 includes a calibration liquid storage part 821 adapted to store calibration liquids, a calibration liquid refilling flow path 822 adapted to refill the calibration liquids, and a calibration liquid circulation mechanism 823 adapted to control the flows of the calibration liquids.

The calibration liquid storage part 821 is one including a first calibration liquid storage tank 821A adapted to store a first calibration liquid and a second calibration liquid storage tank 821B adapted to store a second calibration liquid.

In the first calibration liquid storage tank 821A, a phosphate buffer liquid of which the pH is adjusted to, for example, 6.86 is stored.

In the second calibration liquid storage tank 821B, a phthalate buffer liquid of which the pH is adjusted to, for example, 4.01 is stored.

The calibration liquid refilling flow path 822 is one that is formed of, for example, an elastic tube using an olefinic elastomer or the like as a raw material and preventing water from easily evaporating from the surface, and of which, for example, the length is 300 mm, inside diameter is 1 mm, and outside diameter is 3 mm.

The calibration liquid refilling flow path 822 is one that connects between the sampling flow path 11 and the calibration liquid storage part 821 and includes: a first calibration liquid refilling flow path 822A connecting between the sampling flow path 11 and the first calibration liquid storage tank 821A; and a second calibration liquid refilling flow path 822B connecting between the sampling flow path 11 and the second calibration liquid storage tank 821B.

The calibration liquid circulation mechanism 823 is one including: a calibration liquid refilling pump 823P adapted to introduce the calibration liquids into the sampling flow path 11; a flow path switching part 823V; and a calibration liquid control part.

The calibration liquid refilling pump 823P is such that the sampling pump 121 fulfills a function as the calibration liquid refilling pump 823P.

The flow path switching part 823V is one including: a first valve 823V1 provided at the contact point between the sampling flow path 11 and the first calibration liquid refilling flow path 822A; and a second valve 823V2 provided at the contact point between the sampling flow path 11 and the second calibration liquid refilling flow path 822B.

In the present embodiment, the calibration liquid control part is such that the CPU and its peripheral devices cooperate in accordance with a predetermined program stored in the memory of the information processing circuit 3, and thereby the information processing circuit 3 fulfills a function as the calibration liquid control part.

The information processing circuit also fulfills a function as an action determination part adapted to determine the actions of the measuring instrument 100 on the basis of an input signal such as a measurement start signal, calibration start signal, or stop signal issued by, for example, a user, a preset measurement program, or the like.

Figure 3:
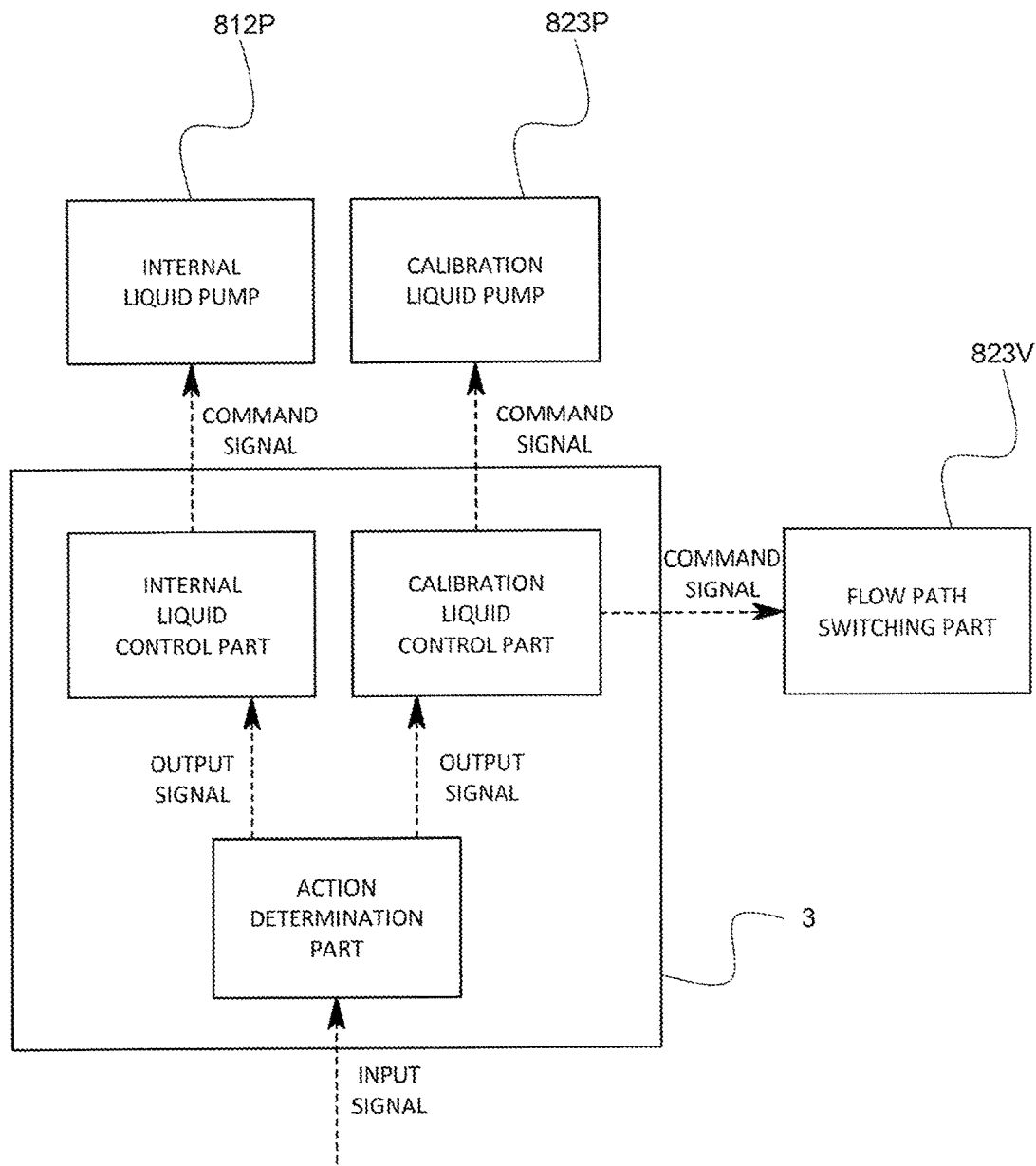
FIG. 3 is a block diagram of determining the actions of the measuring instrument in the same embodiment.

As illustrated in FIG. 3, on the basis of the input signal, the action determination part outputs one of signals respectively corresponding to the measurement state, calibration state, and waiting state to the internal solution control part or the calibration liquid control part as an output signal.

More specifically, for example, the action determination part outputs an output signal corresponding to the waiting state for a period until the measurement start signal or the calibration start signal is inputted since the instrument was powered on.

For example, when the measurement start signal is inputted, the action determination part outputs an output signal corresponding to the measurement state for a period until a preset time passes or the stop signal is inputted since the input signal (the measurement start signal) was inputted.

Also, when the preset time passes or the stop signal is inputted since a previous input signal was inputted, the action determination part outputs the output signal corresponding to the waiting state for a period until the measurement start signal or the calibration start signal is inputted next.

Similarly, for example, when the calibration start signal is inputted, the action determination part outputs an output signal corresponding to the calibration state for a period until a preset time passes or the stop signal is inputted since the input signal (the calibration start signal) was inputted, and when the preset time passes or the stop signal is inputted since a previous input signal was inputted, the action determination part outputs the output signal corresponding to the waiting state for a period until the measurement start signal or the calibration start signal is inputted next.

The internal solution control part is configured to, on the basis of an output signal outputted from the action determination part, output a command signal corresponding to any of the measurement state, calibration state, and waiting state to the internal solution refilling pump 812P.

In addition, it is configured to, when the internal solution refilling pump 812P operates in accordance with the command signal from the internal solution control part, feed the internal solution from the internal solution storage tank 813 to the second internal space S through the internal solution refilling flow path 811 and refill the internal solution.

On the other hand, the calibration liquid control part is configured to, on the basis of an output signal outputted from the action determination part, output a command signal corresponding to any of the measurement state, calibration state, and waiting state to the calibration liquid refilling pump 823P, or to the flow path switching part 823V including the first valve 823V1 and the second valve 823V2.

In addition, it is configured to, when the first valve 823V1 or the second valve 823V2 operates in accordance with the command signal from the calibration liquid control part, and the calibration liquid refilling pump 823P operates in a state where the first calibration liquid refilling flow path 822A or the second calibration liquid refilling flow path 822B is connected to the sampling flow path 11, draw the first calibration liquid or the second calibration liquid from the first calibration liquid storage tank 821A or the second calibration liquid storage tank 821B to the first calibration liquid refilling flow path 822A or the second calibration liquid refilling flow path 822B to refill the first calibration liquid or the second calibration liquid, and flow the resulting excess portion to the sampling flow path 11.

Note that the measurement state of the measuring instrument 100 refers to a state where a measurement sequence operates, including a state where the circulation control mechanism 12 circulates the sampled measured liquid through the sampling flow path 11, a state where the pH calculation part measures the potential difference between the first internal electrode 214 and the second internal electrode 223 and on the basis of the potential difference, calculates the pH of the measured liquid, a state of refilling KCl as the reference electrode internal solution consumed by the measurement, and a state of switching the connection destination of the sampling flow path 11 to, for example, a cleaning liquid tank (not illustrated) by operating a valve (also not illustrated) or another operation and purging the measured liquid or the like inside the sampling flow path 11.

Also, the calibration state of the measuring instrument 100 refers to a state where a calibration sequence operates, including a state where the calibration liquid circulation mechanism 823 circulates the first calibration liquid or the second calibration liquid through the sampling flow path 11, a state where the pH calculation part measures the potential difference between the first internal electrode 214 and the second internal electrode 223 and on the basis of the potential difference, calculates the pH of the first calibration liquid or the second calibration liquid, a state of calibrating the measuring instrument 100, and a state of switching the connection destination of the sampling flow path 11 to, for example, a cleaning liquid tank (not illustrated) by operating a valve (also not illustrated) or another operation and purging the first calibration liquid or the second calibration liquid inside the sampling flow path 11.

Further, the waiting state of the measuring instrument 100 refers to a state of performing neither the measurement nor the calibration, including states such as one where although power is on, neither the measurement nor the calibration is performed, and the measuring instrument is left as it is, or in other words, a state where the measurement sequence or the calibration sequence ends, and a liquid filled in the sampling flow path 11 does not flow.

Connecting parts of the first and second calibration liquid refilling flow paths 822A and 822B with the sampling flow path 11 are sealed by the first and second valves 823V1 and 823V2, respectively, and also the fore ends of tubes forming the first and second calibration liquid refilling flow paths 822A and 822B are immersed in the calibration liquids inside the first and second calibration liquid storage tanks 821A and 821B, respectively. As a result, the first and second calibration liquid flow paths are tightly closed, and the insides of these flow paths are constantly filled with the first and second calibration liquids, respectively.

As illustrated in FIG. 1, the pH calculation part is one adapted to measure the potential difference between the first internal electrode 214 and the second internal electrode 223 and on the basis of the potential difference, calculate the pH of the measured liquid. In the present embodiment, the CPU and its peripheral devices cooperate in accordance with a predetermined program stored in the memory of the information processing circuit 3, and thereby the information processing circuit 3 fulfills a function as the pH calculation part.

Next, an example of actions of the measuring instrument 100 configured as described above will be briefly described.

When the internal solution refilling mechanism 81 refills the internal solution, first, on the basis of an input signal such as the measurement start signal, the action determination part outputs an output signal corresponding to any one of the measurement state, calibration state, and waiting state to the internal solution control part.

After that, the internal solution control part instructs the internal solution refilling pump 821P to refill the second internal space S with the internal solution at a refilling frequency and in a refilling amount appropriate for each of the states from the internal solution storage tank 813 through the internal solution refilling flow path 811 and the internal solution refilling port 7.

When the second internal space S is refilled with the internal solution as described, the internal solution filled in the second internal S flows to the internal solution bypass flow path 6 and the second internal flow path 5 and reaches the liquid junction part 224. At this time, an excess internal solution flows out from the liquid junction part 224 to the sampling flow path 11.

On the other hand, when calibrating a measured value with the calibration liquids, or when the calibration liquid refilling mechanism 82 refills the calibration liquids in the waiting state using, first, for example, on the basis of an input signal such as the measurement start signal, the action determination part outputs an output signal corresponding to any one of the measurement state, calibration state, and waiting state to the calibration liquid control part.

After that, the calibration liquid control part instructs a refilling frequency and a refilling amount appropriate for each of the states by a command signal. The command signal allows the first valve 823V1 to operate to connect the first calibration liquid storage tank 821A to the sampling flow path 11 through the first calibration liquid refilling flow path 822A. In this state, the calibration liquid control part instructs the calibration liquid refilling pump 823P, and thereby the first calibration liquid is drawn from the first calibration liquid storage tank 821A to the first calibration liquid refilling flow path 822A, and flows to the sampling flow path 11. After that, the calibration liquid control part restores the first valve 823V1 to an original position, and thereby the first calibration liquid is stopped from being drawn. Then, the calibration liquid control part instructs the second valve 823V2 to connect the second calibration liquid storage tank 821B to the sampling flow path 11, and thereby the second calibration liquid is drawn from the second calibration liquid storage tank 821B to the second calibration liquid refilling flow path 822B, and flows to the sampling flow path 11.

Note that the refilling frequency and refilling amount of the internal solution refilled by the internal solution refilling mechanism 81 in the measurement state or the calibration state are, for example, a frequency of once per hour and 50 µl each, respectively.

On the other hand, it is thought that the refilling frequency and refilling amount of each of the calibration liquids or the internal solution refilled by the refilling mechanism 8 in the waiting state of performing neither the measurement nor the calibration can be small as compared with those in the measurement state or the calibration state. Therefore, in order to examine an appropriate refilling frequency and refilling amount, the present inventor performed the following experiment.

In the experiment, two types of elastic tubes made of different raw materials were used. A 3.3M KCl aqueous solution was enclosed in the tubes having a length of 300 mm, inside diameter of 1 mm, and outside diameter of 3 mm. Then, the tubes were placed in an oven at a temperature of 55° C. and the internal states of the tubes were observed.

As a result, the KCl aqueous solution that was filled in the 300 mm tubes without any gap at the start of the experiment remained only within tube ranges of 250 mm and 220 mm after 10 days, and there was a tube inside which KCl crystals were precipitated. It can be considered that since the tubes were tightly closed, some portion of water in the KCl aqueous solution permeated through the wall surfaces of the tubes and evaporated.

Further, in an elastic tube using an olefinic elastomer or the like as a raw material and having the length of 300 mm, inside diameter of 1 mm, and outside diameter of 3 mm, from which the water evaporation occurred but in which no crystal had been precipitated for 10 days in the above experiment of examining the water evaporation from the surfaces, a 3.3M KCl aqueous solution was enclosed, and the tube was placed in an oven at a temperature of 55° C. Then, the internal state of the tube was observed while refilling a 3.3M KCl aqueous solution at a frequency of once per day and in an amount of 25 µl each. As a result, KCl crystallization was suppressed for a longer time.

Also, in the case of the tube having the above-described length and inside diameter, by refilling the 3.3M KCl aqueous solution at the frequency of once per day and in the amount of 25 µl, the KCl aqueous solution remaining in the tube for 10 day as described above was able to be wholly replaced with a new 3.3M KCl aqueous solution.

For these reasons, it turns out that in the case of a tube having the above-described length and inside diameter, by refilling a 3.3M KCl aqueous solution at a frequency of once or more times per day and in an amount of 25 µl or more each, even when the waiting state continues for a long time, KCl crystals are not precipitated at room temperature, and consequently the possibility of clogging the tube can be reduce.

Therefore, in the present embodiment, the refilling frequency and refilling amount of each of the calibration liquids or the internal solution refilled by the refilling mechanism 8 are set to a frequency of once per day and an amount of 50 µl each.

In the measuring instrument 100 configured as described above, since even when making the sampling flow path 11 and the internal solution flow path 9 thinner, clogging due to crystallization caused by the evaporation of water in the internal solution or the like can be prevented, the amounts of the sample, calibration liquids, internal solution, and the like to be used can be reduced.

Since the sampling flow path 11 and the internal solution flow path 9 formed in a capillary shape are tightly closed, and the inside of each of them is filled with a corresponding liquid, when refilling each of the calibration liquids or the internal solution, the calibration liquid or the internal solution greatly moves through a corresponding flow path, and therefore a local increase in concentration due to the accumulation of the calibration liquid or the internal solution in one place of the flow path can be suppressed to effectively suppress crystallization.

Since as compared with in the measurement state or in the calibration state, in the waiting state, the amount of each of the calibration liquids or the internal solution to be refilled is small, in the waiting state, the calibration liquid or the internal solution can be refilled at the refilling frequency smaller than the refilling frequency of the calibration liquid or the internal solution in the measurement state or the calibration state, and therefore the amount of using the calibration liquid or the internal solution can be suppressed to an appropriate amount.

Since as long as each of the calibration liquids or the internal solution is refilled at the frequency of once per day and in the amount of 50 µl each that is an amount equal to or more than the amount of water evaporation from a corresponding tube surface, the calibration liquid or the internal solution in the sampling flow path or the internal solution flow path can be replaced with a new one before crystallization takes place without the accumulation of the calibration liquid or the internal solution in the sampling flow path or the internal solution flow path, and therefore the sampling flow path or the internal solution flow path can be prevented from being clogged due to the crystallization of the calibration liquid or the internal solution.

Note that the present invention is not limited to the above-described embodiment.

For example, it is only necessary that the measuring instrument includes a measuring electrode and the reference electrode, and the measuring electrode is not limited to the glass electrode.

The characteristic value of a sample to be measured by the measuring instrument is not limited to a pH but may be a redox potential, ion concentration, electrical conductivity, or the like.

The set of the calibration liquids is not limited to the set of the phosphate buffer liquid of which the pH is adjusted to 6.86 and the phthalate buffer liquid of which the pH is adjusted to 4.01, and as the calibration liquids, one or more other buffer liquids of which the pHs are known may be used, such as an oxalate buffer liquid, borate buffer liquid, and carbonate buffer liquid.

Also, the calibration liquids are not limited to ones of which the pHs are known, but only required to have known characteristic values, respectively. For example, without limitation to any calibration liquid for pH measurement, calibration liquids used for an ion electrode, conductivity electrode, ORP electrode or the like are also possible.

The internal solution is not limited to the 3.3M KCl aqueous solution, but may be another aqueous solution such as a KCl aqueous solution having different concentration or an aqueous solution in which other components are dissolved and the mobilities of positive and negative ions are the same, such as ammonium nitrate or lithium acetate.

The elastic tube forming each of the calibration liquid refilling flow path and the internal solution flow path is not limited to the elastic tube using an olefinic elastomer as a raw material, but may be an elastic tube made of another raw material such as a fluorinated material.

The wall body forming each of the calibration liquid refilling flow path and the internal solution flow path is not limited to the elastic tube, but only required to be one forming a flow path through which each of the calibration liquids or the internal solution flows.

Each of the calibration liquid refilling flow path and the internal solution flow path is not limited to one having the length of 300 mm, inside diameter of 1 mm, and outside diameter of 3 mm, but may be longer or shorter one, or one having a smaller or larger inside diameter.

The refilling frequency and amount of each of the calibration liquids or the internal solution in the waiting state depend on the length or inside diameter of the calibration liquid refilling flow path or the internal solution flow path, and therefore in the present embodiment, the optimum refilling frequency and amount are set to a frequency of once per day and an amount of 50 μl each, respectively. However, without limitation to such refilling frequency and amount, it is only necessary to, for a predetermined time, refill each of the calibration liquids or the internal solution of an amount exceeding the amount of water evaporating from that calibration liquid or the internal solution for the predetermined time through the calibration liquid refilling flow path or the internal solution flow path, and for example, the refilling frequency may be set to once per multiple days or multiple times per day. Alternatively, it may be adapted to constantly flow a tiny amount of each of the calibration liquids or the internal solution.

The measuring instrument can be applied to other various fields without limitation to a semiconductor manufacturing process.

Besides, the present invention is not limited to any of the illustrated embodiments but can be variously modified without departing from the scope thereof.

LIST OF REFERENCE CHARACTERS

| | |
|---|---|
| Measuring instrument | 100 |
| Measuring electrode | 21 |
| Reference electrode | 22 |
| Refilling mechanism | 8 |
| Sampling flow path | 11 |
| Calibration liquid refilling flow path | 822 |
| Internal solution flow path | 9 |

The invention claimed is:

1. A measuring instrument that comprises a measuring electrode and a reference electrode and on a basis of a potential difference generated between the measuring electrode and the reference electrode, measures a characteristic value of a sample,
   the measuring instrument being able to have two states, i.e., a measurement state of measuring the characteristic value of the sample and a waiting state of not performing measurement, and
   the measuring instrument further comprising a refilling mechanism adapted to continuously or intermittently refill a calibration liquid or an internal solution in the waiting state.

2. The measuring instrument according to claim 1, wherein
   a calibration liquid refilling flow path through which the calibration liquid flows and an internal solution flow path through which the internal solution flows are in states of containing the liquids inside, respectively.

3. The measuring instrument according to claim 1, wherein
   a calibration liquid refilling flow path through which the calibration liquid flows and an internal solution flow path through which the internal solution flows are wholly or partly capillary-shaped.

4. The measuring instrument according to claim 1, wherein
   a liquid amount of the calibration liquid or the internal solution refilled for a predetermined time in the waiting state is small as compared with a liquid amount of the calibration liquid or the internal solution refilled for the predetermined time in the measurement state.

5. The measuring instrument according to claim 1, wherein
   the calibration liquid or the internal solution of an amount equal to or more than an amount of water evaporating for a predetermined time in the waiting state is refilled for the predetermined time.

6. The measuring instrument according to claim 1, wherein
   in the waiting state, the calibration liquid or the internal solution is refilled at least once per day and in a predetermined amount.

7. A method for refilling a calibration liquid, or an internal solution used in a reference electrode, for a measuring instrument that comprises a measuring electrode and the reference electrode and on a basis of a potential difference generated between the measuring electrode and the reference electrode, measures a characteristic value of a sample, the measuring instrument being able to have two states, i.e., a measurement state of measuring the characteristic value of the sample and a waiting state of not performing measurement, and further comprising a refilling mechanism adapted to continuously or intermittently refill the calibration liquid or the internal solution in the waiting state, and
   the method comprising a step for, in the waiting state, the refilling mechanism to continuously or intermittently refill the calibration liquid, or the internal solution used in the reference electrode, for the measuring instrument.

* * * * *

UNITED STATES PATENT AND TRADEMARK OFFICE
CERTIFICATE OF CORRECTION

PATENT NO. : 10,684,252 B2
APPLICATION NO. : 15/362290
DATED : June 16, 2020
INVENTOR(S) : Kazuhiro Miyamura and Yoko Nakai Page 1 of 3

It is certified that error appears in the above-identified patent and that said Letters Patent is hereby corrected as shown below:

On the Title Page

Delete the title page and replace with the attached title page

In the Claims

At Column 13, Lines 55-59 and Column 14, Lines 1-21:
Delete Claims 1-3; and
Insert --1. A measuring instrument, comprising:
    a measuring electrode and a reference electrode immersed in a calibration liquid or an internal solution contained within a body, the measuring instrument being configured to measure a characteristic value of a sample on a basis of a potential difference generated between the measuring electrode and the reference electrode;
    an information processing circuit configured to control the measuring instrument in two states including a measurement state of measuring the characteristic value of the sample and a waiting state of not performing measurement; and
    a refilling mechanism configured to continuously or intermittently refill the calibration liquid or the internal solution into the body in the waiting state, wherein
    the refilling mechanism includes an internal solution refilling pump provided in an internal solution refilling flow path and a calibration liquid refilling pump provided in a calibration liquid refilling flow path; and
    in the waiting state, the information processing circuit controls the internal solution refilling pump to continuously or intermittently flow the internal solution through the internal solution refilling flow path into the body, and further controls the calibration liquid refilling pump to continuously or intermittently flow the calibration liquid through the calibration liquid refilling flow path into the body.

2. The measuring instrument according to claim 1, wherein
    the calibration liquid refilling flow path through which the calibration liquid flows and the internal solution refilling flow path through which the internal solution flows are in states of Signed and Sealed this
Twenty-eighth Day of December, 2021

Drew Hirshfeld
*Performing the Functions and Duties of the*
*Under Secretary of Commerce for Intellectual Property and*
*Director of the United States Patent and Trademark Office* containing the liquids inside, respectively.

3. The measuring instrument according to claim 1, wherein
the calibration liquid refilling flow path through which the calibration liquid flows and the internal solution refilling flow path through which the internal solution flows are wholly or partly capillary-shaped.--

In Column 14, Lines 41-58:
Delete Claim 7; and
Insert --7. A method for refilling a calibration liquid, or an internal solution used in a reference electrode, for a measuring instrument that comprises a measuring electrode and the reference electrode immersed in the calibration liquid or the internal solution contained within a body, the measuring instrument being configured to measure a characteristic value of a sample on a basis of a potential difference generated between the measuring electrode and the reference electrode, an information processing circuit configured to control the measuring instrument in two states including a measurement state of measuring the characteristic value of the sample and a waiting state of not performing measurement, and a refilling mechanism adapted to continuously or intermittently refill the calibration liquid or the internal solution in the waiting state, the method comprising:
in the waiting state, via the refilling mechanism, continuously or intermittently refilling into the body the calibration liquid, or the internal solution used in the reference electrode, for the measuring instrument, wherein
the refilling mechanism includes an internal solution refilling pump provided in an internal solution refilling flow path and a calibration liquid refilling pump provided in a calibration liquid refilling flow path; and
the method further includes, in the waiting state, controlling the internal solution refilling pump to continuously or intermittently flow the internal solution through the internal solution refilling flow path into the body, and further controlling the calibration liquid refilling pump to continuously or intermittently flow the calibration liquid through the calibration liquid refilling flow path into the body.--

After the end of Claim 7 at Column 14, Line 59:
Insert --8. The method of claim 7, wherein
the internal solution is selected from the group consisting of: KCl aqueous solution, ammonium nitrate solution, and lithium acetate.

9. The measuring instrument according to claim 1, wherein
the internal solution is selected from the group consisting of: KCl aqueous solution, ammonium nitrate solution, and lithium acetate.--

(12) United States Patent
Miyamura et al.

(10) Patent No.: US 10,684,252 B2
(45) Date of Patent: Jun. 16, 2020

(54) MEASURING INSTRUMENT

(71) Applicant: HORIBA, Ltd., Kyoto-shi, Kyoto (JP)

(72) Inventors: Kazuhiro Miyamura, Kyoto (JP); Yoko Nakai, Kyoto (JP)

(73) Assignee: HORIBA, Ltd., Kyoto-shi, Kyoto (JP)

(*) Notice: Subject to any disclaimer, the term of this patent is extended or adjusted under 35 U.S.C. 154(b) by 388 days.

(21) Appl. No.: 15/362,290

(22) Filed: Nov. 28, 2016

(65) Prior Publication Data
US 2017/0168011 A1 Jun. 15, 2017

(30) Foreign Application Priority Data
Dec. 14, 2015 (JP) .................. 2015-243582

(51) Int. Cl.
*G01N 27/30* (2006.01)
*G01N 27/36* (2006.01)
*G01N 27/416* (2006.01)

(52) U.S. Cl.
CPC ....... *G01N 27/4167* (2013.01); *G01N 27/301* (2013.01); *G01N 27/36* (2013.01)

(58) Field of Classification Search
CPC ... G01N 27/4167; G01N 27/301; G01N 27/36
USPC ....................... 324/438; 204/403.13
See application file for complete search history.

(56) References Cited

U.S. PATENT DOCUMENTS

| | | | |
|---|---|---|---|
| 4,579,641 A * | 4/1986 | Shimomura | G01N 27/4035 204/403.13 |
| 6,365,033 B1 * | 4/2002 | Graham | G01N 27/4161 204/412 |
| 2009/0283404 A1 | 11/2009 | Kakiuchi et al. | |
| 2011/0147213 A1 * | 6/2011 | Auerswald | G01N 27/36 204/415 |

FOREIGN PATENT DOCUMENTS

| | | |
|---|---|---|
| CN | 1266487 A | 9/2000 |
| CN | 101523201 A | 9/2009 |
| CN | 102183564 A | 9/2011 |

(Continued)

OTHER PUBLICATIONS

Japan Patent Office, Office Action Issued in Application No. 2016238425, Sep. 30, 2019, 6 pages.

(Continued)

*Primary Examiner* — Farhana A Hoque
(74) *Attorney, Agent, or Firm* — Alleman Hall Creasman & Tuttle LLP

(57) ABSTRACT

A measuring instrument is capable of suppressing a flow path from being clogged due to the precipitation of crystals from an internal solution or a calibration liquid even when kept in a waiting state. The measuring instrument includes a measuring electrode and a reference electrode and on the basis of the potential difference generated therebetween, measures a characteristic value of a sample. In order to accomplish the above object, the measuring instrument is adapted to be able to have two states, i.e., a measurement state of measuring the characteristic value of the sample and a waiting state of not performing measurement, and further include a refilling mechanism that refills the calibration liquid or the internal solution used in the reference electrode. In addition, the refilling mechanism is adapted to continuously or intermittently refill the calibration liquid or the internal solution in the waiting state.

9 Claims, 4 Drawing Sheets